(12) United States Patent
Furukawa et al.

(10) Patent No.: US 6,804,827 B1
(45) Date of Patent: Oct. 12, 2004

(54) TRANSMISSION SYSTEM AND METHOD SIGNAL ADJUSTING APPARATUS AND METHOD AND ROUTING APPARATUS

(75) Inventors: Jun Furukawa, Kanagawa (JP); Takashi Hirasawa, Kanagawa (JP); Kimiyasu Satoh, Kanagawa (JP); Michio Mita, Kanagawa (JP); Katsuhito Tsujimura, Kanagawa (JP); Yasushi Aoyagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/397,202

(22) Filed: Sep. 16, 1999

(30) Foreign Application Priority Data

Sep. 18, 1998 (JP) .......................................... 10-264820
Sep. 24, 1998 (JP) .......................................... 10-270050

(51) Int. Cl.[7] ............................. H04N 7/16; H04N 5/50
(52) U.S. Cl. ...................................... 725/140; 348/569
(58) Field of Search ......................... 725/48, 132, 140, 725/152; 348/569, 553, 738

(56) References Cited

U.S. PATENT DOCUMENTS 5,822,018 A * 10/1998 Farmer ....................... 348/705
5,880,792 A * 3/1999 Ward et al. .................. 348/722
5,892,910 A * 4/1999 Safadi ......................... 709/217
6,188,439 B1 * 2/2001 Kim ............................ 348/553
6,263,502 B1 * 7/2001 Morrison et al. ............. 725/47
6,378,129 B1 * 4/2002 Zetts ............................ 725/94

* cited by examiner

Primary Examiner—Vivek Srivastava
Assistant Examiner—Hunter Lonsberry
(74) Attorney, Agent, or Firm—Frommer Lawrence & Haug LLP; William S. Frommer; Bruno Polito

(57) ABSTRACT

An object of the present invention is to provide a multi-channel transmission system suitable for a digital broadcasting system that broadcasts television programs of many channels. Specifically, a selected one of television programs of a plurality of channels is supplied to an AV adjusting device. At this time, the selected television program is supplied to a monitor to allow recognition of its adjustment state. Since video signals and audio signals of television programs supplied from respective program supplying companies and program producing companies have different characteristics, they need to be adjusted to have common characteristics. Adjusted television programs and unselected television programs are supplied to a multiplexing section via routers.

6 Claims, 16 Drawing Sheets

FIG. 6 (A)

| ADJUSTMENT BUTTON Cv | ADJUSTMENT ITEM | ADJUSTMENT VALUE RANGE | % DISPLAY | HEXADECIMAL DISPLAY |
|---|---|---|---|---|
| C-1 | VIDEO SIGNAL GAIN | -20 ~ +20 (IRE) | -100 ~ +100 | 00h ~ FFh |
| C-2 | CHROMA SIGNAL GAIN | -30% ~ +30% | -100 ~ +100 | 00h ~ FFh |
| C-3 | OFFSET | -7.5 ~ +7.5 (IRE) | -100 ~ +100 | 00h ~ FFh |
| C-4 | HUE | -20 ~ +20 (deg) | -100 ~ +100 | 00h ~ FFh |

FIG. 6 (B)

| ADJUSTMENT BUTTON | ADJUSTMENT ITEM | INITIAL VALUE | % DISPLAY | HEXADECIMAL DISPLAY |
|---|---|---|---|---|
| C-1 | VIDEO SIGNAL GAIN | 0IRE | 000 | 80h |
| C-2 | CHROMA SIGNAL GAIN | 0% | 000 | 80h |
| C-3 | OFFSET | 0IRE | 000 | 80h |
| C-4 | HUE | 0deg | 000 | 80h |

FIG. 7 (A)

| ADJUSTMENT BUTTON C | ADJUSTMENT ITEM | ADJUSTMENT VALUE RANGE | % DISPLAY | HEXADECIMAL DISPLAY |
|---|---|---|---|---|
| C-5 | CH1 LEVEL | -6dB ~ +6dB | -100 ~ +100 | 00h ~ FFh |
| C-6 | CH2 LEVEL | -6dB ~ +6dB | -100 ~ +100 | 00h ~ FFh |
| C-7 | CH3 LEVEL | -6dB ~ +6dB | -100 ~ +100 | 00h ~ FFh |
| C-8 | CH4 LEVEL | -6dB ~ +6dB | -100 ~ +100 | 00h ~ FFh |
| C-9 | OUTPUT-1 | +CH1 ~ +CH4 | +CH1 ~ +CH4 | 00h ~ 03h |
| RP-1 | PHASE | -CH1 ~ -CH4 | -CH1 ~ -CH4 | 04h ~ 07h |
| C-10 | OUTPUT-2 | +CH1 ~ +CH4 | +CH1 ~ +CH4 | 00h ~ 03h |
| RP-2 | PHASE | -CH1 ~ -CH4 | -CH1 ~ -CH4 | 04h ~ 07h |
| C-11 | OUTPUT-3 | +CH1 ~ +CH4 | +CH1 ~ +CH4 | 00h ~ 03h |
| RP-3 | PHASE | -CH1 ~ -CH4 | -CH1 ~ -CH4 | 04h ~ 07h |
| C-12 | OUTPUT-4 | +CH1 ~ +CH4 | +CH1 ~ +CH4 | 00h ~ 03h |
| RP-4 | PHASE | -CH1 ~ -CH4 | -CH1 ~ -CH4 | 04h ~ 07h |
| C-13 | DELAY | 0-15 | 00-15 | 00h ~ 0Fh |

FIG. 7 (B)

| ADJUSTMENT BUTTON C | ADJUSTMENT ITEM | INITIAL VALUE | % DISPLAY | HEXADECIMAL DISPLAY |
|---|---|---|---|---|
| C-5 | CH1 LEVEL | 00dB | 000 | 80h |
| C-6 | CH2 LEVEL | 00dB | 000 | 80h |
| C-7 | CH3 LEVEL | 00dB | 000 | 80h |
| C-8 | CH4 LEVEL | 0dB | 000 | 80h |
| C-9 | OUTPUT-1 | +CH1 | +CH1 | 00h |
| RP-1 | PHASE | | | |
| C-10 | OUTPUT-2 | +CH2 | +CH2 | 00h |
| RP-2 | PHASE | | | |
| C-11 | OUTPUT-3 | +CH3 | +CH3 | 00h |
| RP-3 | PHASE | | | |
| C-12 | OUTPUT-4 | +CH4 | +CH4 | 00h |
| RP-4 | PHASE | | | |
| C-13 | DELAY | 0 | 00 | 00h |

FIG. 8

| ADJUSTMENT BUTTON C | DISPLAY | HEXADECIMAL DATA | DISPLAY CONTENT |
|---|---|---|---|
| ADJUSTMENT BUTTON C-14 (VIDEO SIGNAL STATE) | OKI | 00h | NORMAL |
| | NORF | 01h | NO REFERENCE |
| | DIAG | 02h | DIALOG EXISTS |
| | NOUT | 04h | NO VIDEO OUTPUT SIGNAL |
| | PWDN | 08h | POWER OFF |
| | ERR | OTHER THAN THE ABOVE | DATA ERROR |
| ADJUSTMENT BUTTON C-15 (AUDIO SIGNAL STATE) | OKI | 00h | NORMAL |
| | NORF | 01h | NO REFERENCE |
| | DIAG | 02h | DIALOG EXISTS |
| | ERR | OTHER THAN THE ABOVE | DATA ERROR |

AV REMOTE CONTROLLER 31-1

AV ADJUSTING DEVICE 33-1

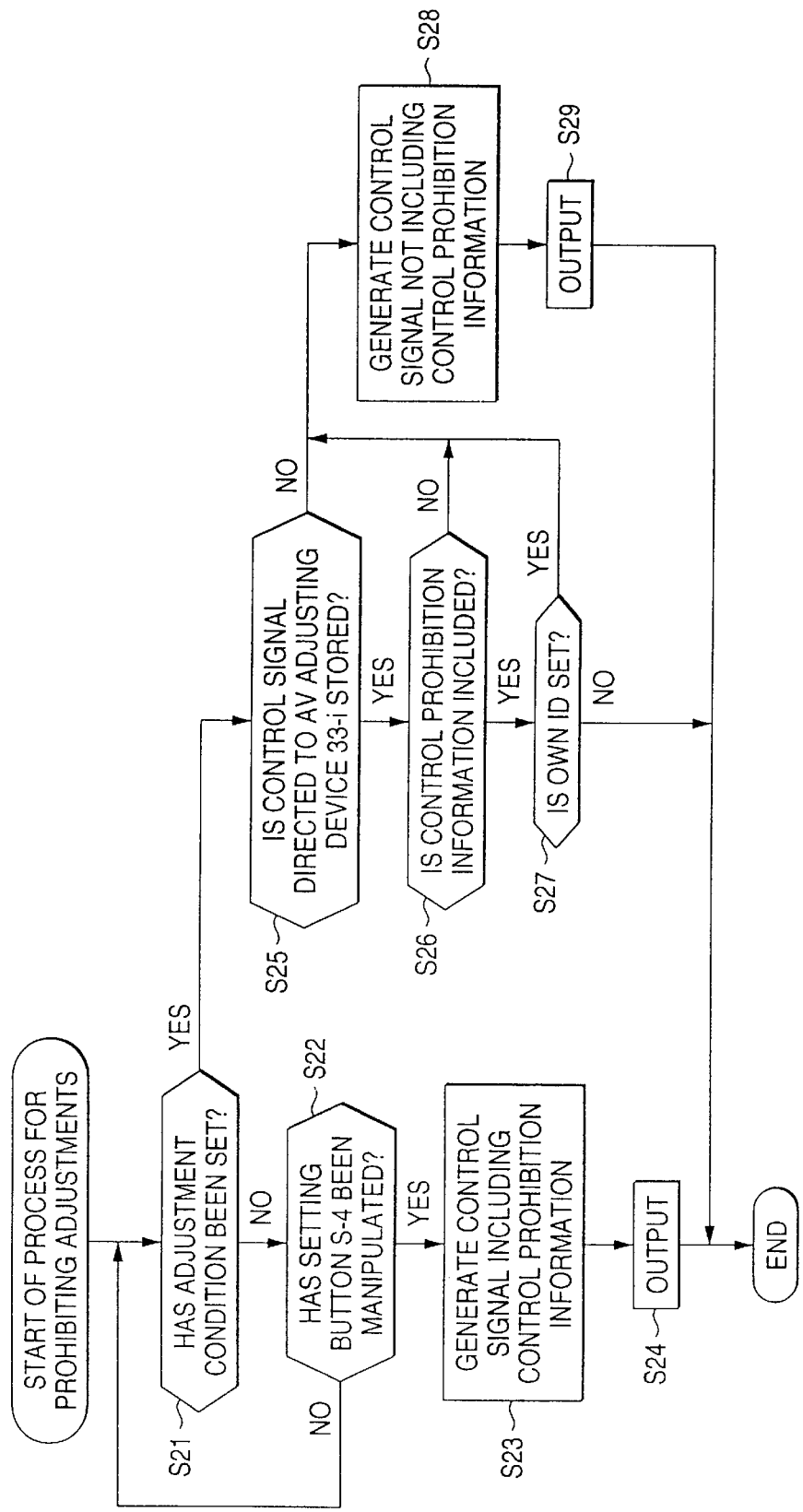

TRANSMISSION SYSTEM AND METHOD SIGNAL ADJUSTING APPARATUS AND METHOD AND ROUTING APPARATUS

BACKGROUND OF THE INVENTION

1. Field of the Invention

The present invention relates to a signal transmission system and method, a signal adjusting apparatus and method, and a routing apparatus that are used in multi-channel digital broadcasting systems. In particular, the invention relates to a system which efficiently adjusts and routes a video signal and/or an audio signal that is included in a multi-channel television program.

2. Description of the Related Art

At present, digital broadcasting systems are proposed in which video data or audio data is compressed and coded by using the MPEG2 (Moving Picture Experts Group Phase 2) and a resulting coded stream is broadcast by ground waves or satellite-relayed waves. Such digital broadcasting systems can transmit television programs of 100 or more channels simultaneously even by using an existing transmission bandwidth because a video signal and an audio signal of each channel are compressed by using the MPEG standard.

FIG. 1 shows an example configuration of a conventional 1-channel broadcasting system. A broadcast program schedule planning section 1 generates and registers in itself a program schedule table for management of the broadcast hours of program materials that are supplied from program suppliers. Further, the broadcast program schedule planning section 1 supplies proper control commands to a program material providing section 2 and a multiplexing section 3 so that television programs will be broadcast according to the generated program schedule table.

The program material providing section 2 performs switching and image processing such as special-effects processing on a video signal and an audio signal of a television program that is supplied from an editing studio or a news studio within a broadcasting station, and outputs, to the multiplexing section 3, a program (a video signal and an audio signal) that is based on the program schedule table supplied from the broadcast program schedule planning section 1.

Based on the program schedule table supplied from the broadcast program schedule planning section 1, the multiplexing section 3 codes the video signal and the audio signal that are supplied from the program material providing section 2 according to the MPEG standard, and multiplexes encoded video and audio signals.

As described above, future digital broadcasting systems are required to transmit television programs of 100 or more channels. However, it is difficult for existing broadcasting stations to produce television programs of 100 or more channels by themselves. Therefore, it is a common practice that broadcasting stations are supplied with a plurality of program supplying companies or program producing companies.

In this case, since each program supplying company or program producing company produces television programs by using its own broadcasting equipment, the characteristics of a video signal and an audio signal that constitute a television program vary depending on the program supplying company or program producing company. The characteristics of a video signal mean its level, the gain value of its chroma component, the gain and hue offset values, etc. The characteristics of an audio signal mean the levels of the respective audio channels such as the levels of the first to fourth audio channels to which a plurality of languages (English, Japanese, and French) are assigned and the levels of the respective audio channels to which stereo sounds (right audio and left audio) are assigned, and other characteristics.

That is, a broadcasting station is supplied, from respective program supplying companies and program producing companies, with pairs of video signals and audio signals that have different characteristics. Therefore, if television programs that are supplied from the respective program supplying companies and program producing companies were broadcast to homes as they are, that is, without being modified, viewers would have a sense of incongruity when they change the channel of television programs. For example, if channels of television programs have a difference in video signal level, there occurs a problem that the brightness of a television picture varies when a viewer switches between those channels. There is another problem that the language of a sound that is output from a television receiver varies when a viewer switches the channel from one television program in which English is assigned to the first audio channel and Japanese is assigned to the second audio channel to another television program in which French is assigned to the first channel and English is assigned to the second audio channel.

SUMMARY OF THE INVENTION

An object of the present invention is to provide a multi-channel transmission system suitable for a digital broadcasting system that broadcasts television programs of many channels.

Another object of the invention is to provide a signal adjusting apparatus that modifies television programs having different characteristics that are supplied from respective program supplying companies and program producing companies into ones having common characteristics.

A further object of the invention is to make it possible to adjust television programs of a plurality of channels easily in a short time in adjusting the signal characteristics of the respective television programs.

According to an aspect of the invention, there is provided a transmission system for transmitting television programs of a plurality of channels, comprising means for receiving a plurality of source television programs supplied from a plurality of program supply sources, respectively; routing means for selecting at least one of the plurality of source television programs, and for routing the selected source television program; means for adjusting a video signal and/or audio signal included in the selected television program so that the video signal and/or the audio signal of the selected source television program and video signals and/or audio signals of the other source television programs have common settings; and transmitting means for multiplexing an adjusted television program that is output from the adjusting means with the other television programs that are output from the routing means, and transmitting multiplexed television signals.

According to another aspect of the invention, there is provided a signal adjusting apparatus for adjusting video signals and/or audio signals constituting a plurality of television programs, comprising means for receiving a plurality of source television programs; routing means for routing the plurality of source television programs, and for selecting at least one of the plurality of source television programs; and means for adjusting a video signal and/or audio signal of the selected television program so that the video signal and/or the audio signal of the selected television program and video signals and/or audio signals of the other television programs have common characteristics.

According to a further aspect of the invention, there is provided a routing apparatus for routing a plurality of source television programs, comprising selecting means for selecting at least one of the plurality of source television programs; routing means for routing television programs; adjusting means for adjusting a characteristic of a video signals and/or an audio signals of a source television signal, and for outputting an adjusted television program; and control means for controlling the routing means so that the selected source television program is supplied to the adjusting means and that the adjusted television program and source television programs that were not selected by the selecting means are supplied to multiplexing means.

According to a still further aspect of the invention, there is provided a routing apparatus for routing a plurality of source television programs, comprising selecting means for selecting at least one of the plurality of source television programs; routing means for routing television programs; adjusting means for adjusting a characteristic of a video signals and/or an audio signals of a source television signal, and for outputting an adjusted television program; monitoring means for monitoring a video signal and/or an audio signal of the adjusted television program; and control means for controlling the routing means so that the selected television program is supplied to the adjusting means and that the adjusted television program that is output from the adjusting means is supplied to the monitoring means so that a result of an adjustment by the adjusting means of the video signal and/or the audio signal of the adjusted television program can be monitored on a real-time basis by the monitoring means.

BRIEF DESCRIPTION OF THE DRAWINGS

FIGS. 6(A) and 6(B) are tables showing adjustment items of a video signal;

FIGS. 7(A) and 7(B) are tables showing adjustment items of audio signals;

FIG. 8 is a table showing a display example in a display section D-4;

FIG. 17 is a flowchart illustrating a process for prohibiting program adjustments.

DETAILED DESCRIPTION OF THE PREFERRED EMBODIMENTS

Figure 1:
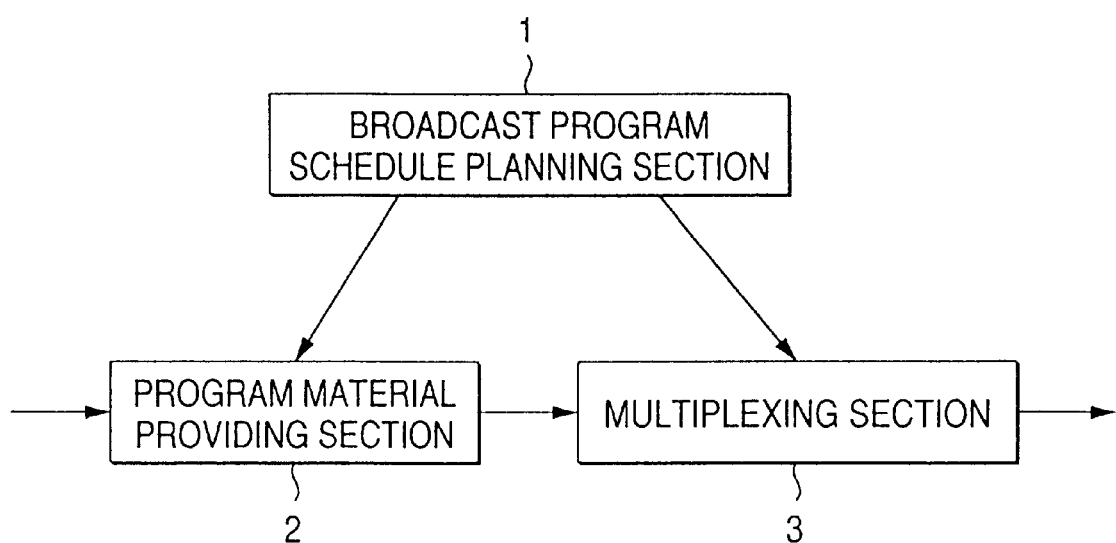
FIG. 1 is a block diagram showing an example configuration of a conventional broadcasting system.
Figure 2:
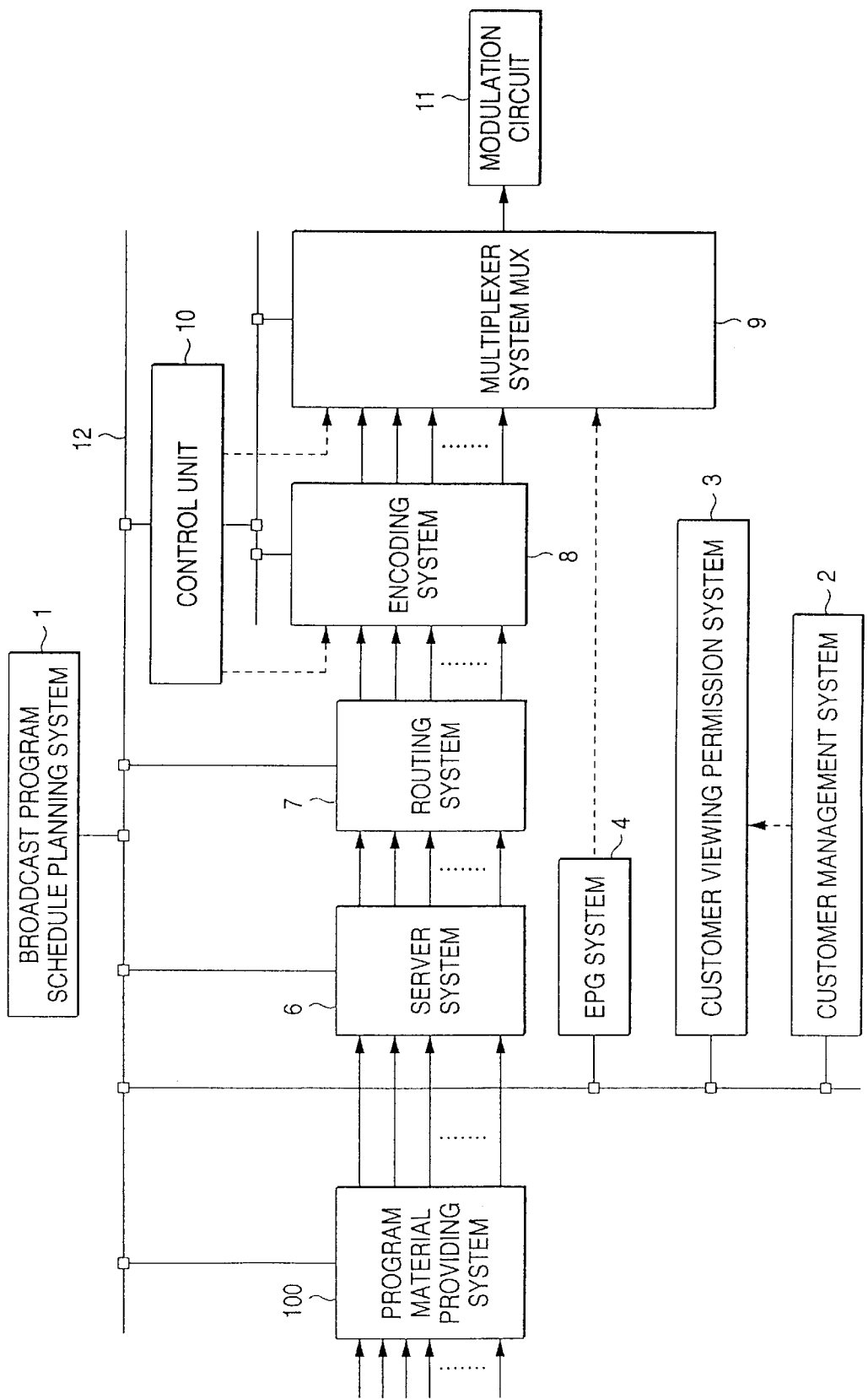
FIG. 2 is a block diagram showing an example configuration of a digital broadcast system according to the present invention.

FIG. 2 shows an example configuration of a digital broadcast system. A program schedule table for management of the broadcast hours of program materials etc. that are supplied from program suppliers is registered in a broadcast program schedule planning system 1. According to the program schedule table, the broadcast schedule planning system 1 controls a customer management system 2 to a modulation circuit 11.

The customer management system 2 manages information relating to customer management such as customer registration information and accounting information, and generates information to be supplied to a customer viewing permission system 3 such as information relating to the contracts with viewers and information relating to the setting of scrambling for disabling viewing of programs.

The customer viewing permission system 3 encodes information that is supplied from the customer management system 2 and generates packet data that will be multiplexed in a multiplexer system 9.

An EPG system 4 generates data for introducing programs such as broadcast hours and program contents (hereinafter referred to as "EPG data") and supplies it to the multiplexer system 9.

A program material providing system 5 adjusts, when necessary, video signals and audio signals of programs that are supplied from program suppliers and outputs resulting signals to a server system 6.

Constituted of disk drives that are connected together in array form, a control computer, etc., the server system 6 holds programs that are supplied from the program material providing system 5. Further, the server system 6 generates programs of the respective channels according to the program schedule table of the broadcast program schedule planning system 1 and supplies those programs to a routing system 7.

According to the program schedule table that is supplied from the broadcast program schedule planning system 1, the routing system 7 performs routing so that a plurality of programs that are supplied from the server system 6 are output on proper channels.

Controlled by a control unit 10, an encoding system 8 encodes, according to the MPEG2 standard, for example, video signals and audio signals of programs that are supplied from the routing system 7, and outputs resulting signals to the multiplexer system 9.

The control unit 10 acquires, via a LAN 12, packet data that are generated by the customer viewing permission system 3 and supplies those to the multiplexer system 9. Controlled by the control unit 10, the multiplexer system 9 multiplexes information that is supplied from the control unit 10 with EPG data that is supplied from the EPG system 4 and signals that are supplied from the encoding system 8 and outputs a resulting signal to the modulation circuit 11.

The modulation circuit 11 modulates a multiplexed signal that is supplied from the multiplexer system 9 and transmits a resulting signal to a satellite (not shown).

Figure 3:
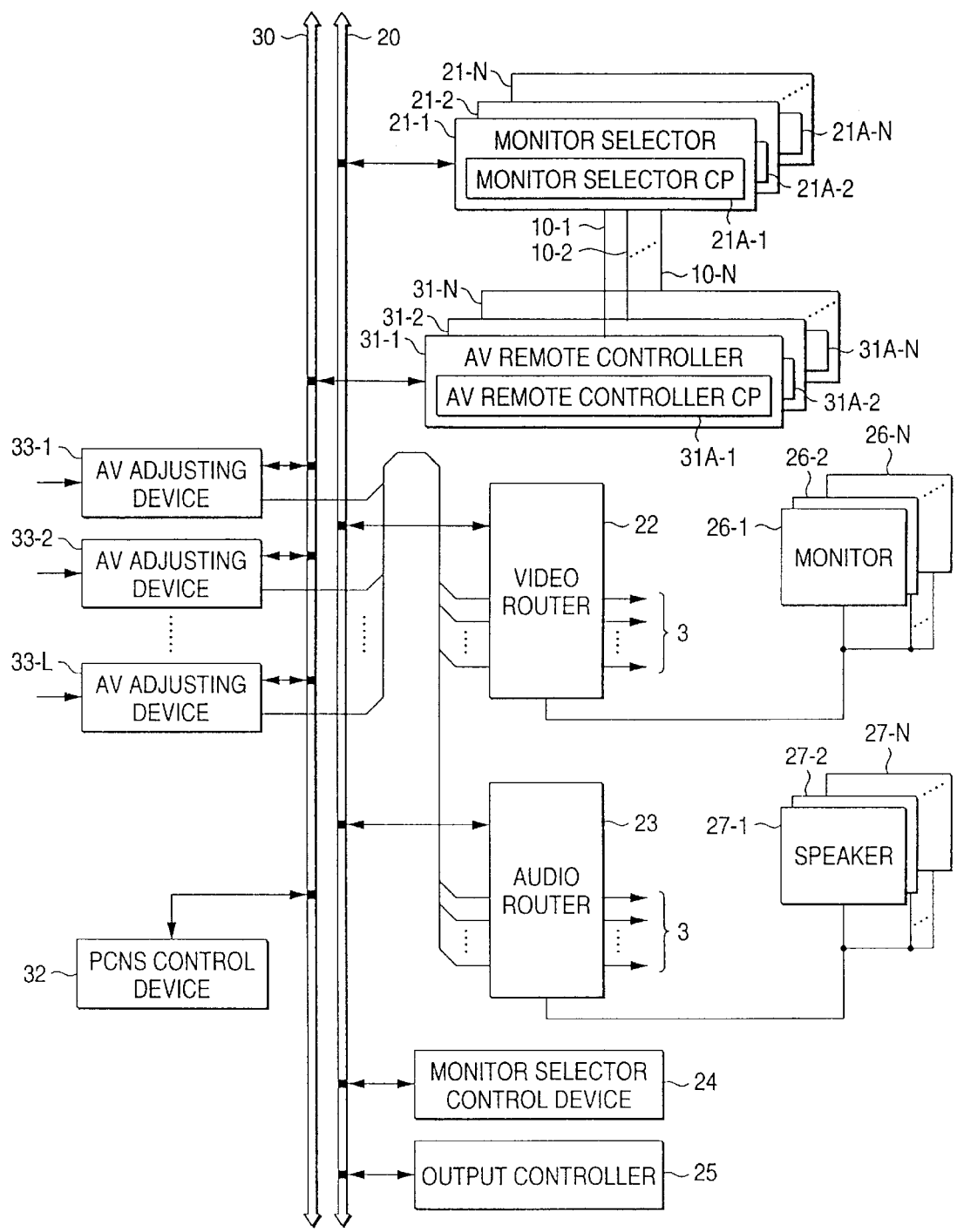
FIG. 3 is a block diagram showing an example configuration of a program material providing section 2 shown in FIG. 2.

FIG. 3 shows a specific configuration of the program material providing section 100. In this example, there are two buses: a router bus 20 and a PCNS (processor control network system) bus 30. N monitor selectors 21-1 to 21-N, a video router 22, an audio router 23, a monitor selector control device 24, and an output controller 25 are connected to the router bus 20. N AV remote controllers 31-1 to 31-N, a PCNS control device 32, L AV adjusting devices 33-1 to 33-L are connected to the PCNS bus 30.

Figure 4:
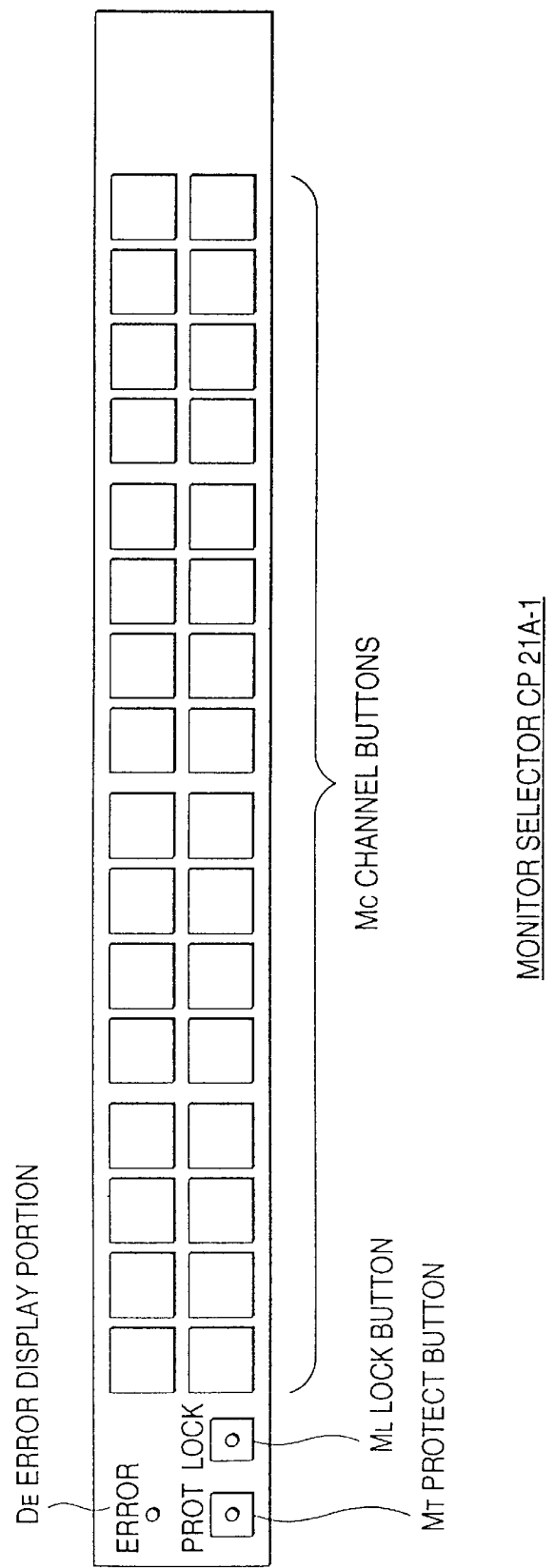
FIG. 4 shows an example of a monitor selector CP 21A-1 shown in FIG. 3.

The monitor selector 21-1 generates a control signal to cause a monitor 26-1 to display video of the program of a channel that is selected by the user's manipulation of a monitor selector control panel (hereinafter abbreviated as "monitor selector CP") 21A-1 and to cause a speaker 27-1 to output its sound, and outputs the control signal to the monitor selector control device 24 via the router bus 20. As shown in FIG. 4, the monitor selector CP 21A-1 is composed of channel buttons $M_C$ that are manipulated to select a channel, a lock button $M_L$ for disabling use of the monitor selector CP 21A-1, a protect button $M_T$ for disabling adjustments for a selected channel, and an error display portion $D_E$.

Further, connected to the AV remote controller 31-1 via a 9P cable 10-1 with an RS-422C interface, the monitor selector 21-1 supplies the number of a selected channel to the AV remote controller 31-1.

The monitor selectors 21-2 to 21-N are configured in the same manner as the monitor selector 21-1 and hence will not be described.

The monitor selector control device 24 stores control signals that are output from the monitor selectors 21 in a built-in memory, and reads out the control signals and outputs those to the video router 22 and the audio router 23 via the router bus 20.

Directly connected to the AV adjusting devices 33 and the monitors 26, the video router 22 performs routing so that a video signal that is output from an AV adjusting device 33 corresponding to a channel specified by a control signal that is output from the monitor selector control device 24 is supplied to a similarly specified monitor 26. This configuration allows the user to monitor video of the program of a selected channel.

Directly connected to the AV adjusting devices 33 and the speakers 27, the audio router 23 performs routing so that an audio signal that is output from an AV adjusting device 33 corresponding to a channel specified by a control signal that is output from the monitor selector control device 24 is supplied to a specified speaker 27. This configuration allows the user to monitor sound of the program of a selected channel.

The video signal and the audio signal that are output from the video router 22 and the audio router 23, respectively, are also supplied to the multiplexing section 3. This is controlled by the output controller 25 that is connected to the router bus 20.

The AV remote controller 31-1 receives and stores a control signal (described later) that is transmitted from the PCNS control device 32 via the PCNS bus 30. The AV remote controller 31-1 is supplied with a channel number from the remote controller 21-1 via the 9P cable 10-1.

When an adjustment condition (i.e., an adjustment item and its adjustment value) is set by the user's manipulation of the AV remote controller control panel (hereinafter abbreviated as "AV remote controller CP") 31A-1, the AV remote controller 31-1 compares the adjustment condition thus set with a stored adjustment condition that was set by a control signal that was supplied from the PCNS control device 32. If they are different from each other, the AV remote controller 31-1 generates a control signal based on the channel number that was supplied from the monitor selector 21-1 and the thus-set adjustment condition and outputs it to the PCNS control device 32 via the PCNS bus 30.

In this example, communication between the AV remote controller 31-1 and the PCNS control device 32 is performed by polling in which the AV remote controller 31-1 and the PCNS control device 32 are made a slave and a host, respectively. Therefore, the AV remote controller 31-1 outputs a generated control signal to the PCNS control device 32 after its transmission is permitted by the PCNS control device 32.

Figure 5:
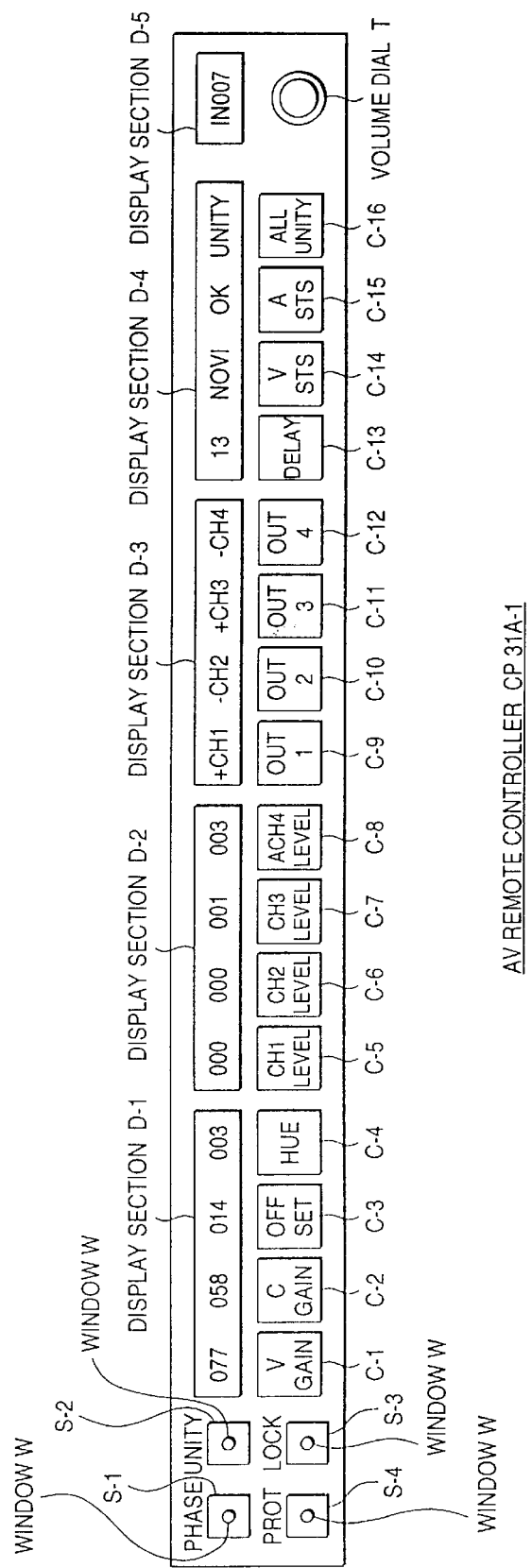
FIG. 5 shows an example of an AV remote controller CP 31A-1 shown in FIG. 3.

FIG. 5 shows an example of the AV remote controller CP 31A. In this example, the AV remote controller CP 31A serves for adjustment of a video signal of a 1-channel program and audio signals of 4-channel programs. Four adjustment buttons C-1 to C-4 are selected in adjusting a video signal. The user sets an adjustment value by selecting any of those buttons and manipulating a volume dial T.

As shown in FIG. 6(A), the user can adjust the gain of a video signal in a range of −20 to +20 IRE by selecting the adjustment button C-1. Similarly, the user can adjust the gain of a chroma signal in a range of −30% to +30% by selecting the adjustment button C-2, can adjust the offset in a range of −7.5 to +7.5 IRE by selecting the adjustment button C-3, and can adjust the hue in a range of −20 to +20 degrees by selecting the adjustment button C-4. Adjustment values of the respective items are displayed in a display section D-1 in percent (−100% to +100%) or in hexadecimal form (00h to FFh). FIG. 6(B) shows initial values of the gain of a video signal, the gain of a chroma signal, the offset, and the hue as well as percent display examples (000%) and hexadecimal display examples (80h) in the display section D-1.

Four adjustment buttons C-5 to C-8, which are disposed on the right of the adjustment button C-4, are selected in adjusting the levels of audio signals. The user can adjust the levels of audio signals of programs of four channels CH1–CH4 in a range of −6 to +6 dB as shown in rows "C-5" to "C-8" in FIG. 7(A), respectively, by selecting any of those buttons and manipulating the volume dial T. Adjustment values of the respective items are displayed in a display section D-2 in percent (−100% to +100%) or in hexadecimal form (00h to FFh). FIG. 7(B) shows, in rows "C-5" to "C-8," initial values of the audio signal levels as well as percent display examples (000%) and hexadecimal display examples (80h) in the display section D-2.

Four adjustment buttons C-9 to C-12, which are disposed on the right of the adjustment button C-8, are selected in adjusting the phases of audio signals. The user can adjust the positive phases of audio signals of programs as shown in rows "C-9" to "C-12" in FIG. 7(A), respectively, by selecting any of those buttons and manipulating the volume dial T.

The user can also adjust the negative phases of audio signals of programs as shown in rows "$R_P$-1" to "$R_P$-4" in FIG. 7(A), respectively, by manipulating a setting button S-1. In this case, the switching among the adjustment items is made by a toggle operation. Adjustment values of the respective items are displayed in a display section D-3. FIG. 7(B) shows, in rows "C-9" to "C-12," initial values of the phases of audio signals as well as percent display examples and hexadecimal display examples in the display section D-3.

An adjustment button C-13 is selected in adjusting the delay of an audio signal. The user can adjust the delay in a range of 0 to 15 fields as shown in row "C-13" in FIG. 7(A) by selecting the adjustment button C-13 and manipulating the volume dial T. An adjustment value is displayed in a display section D-4. FIG. 7(B) shows, in row "C-13," an initial value of the delay of an audio signal as well as a percent display example and a hexadecimal display example in the display section D-4.

An adjustment button C-14 is to display the status of a video signal of a selected program. When the adjustment button C-14 is selected, for example, a display as shown in FIG. 8 is made in the display section D-4 in accordance with the status of a video signal. FIG. 8 shows explanations of the contents of displays and hexadecimal data of the respective displays.

An adjustment button C-15 is to display the status of an audio signal of a selected program. An adjustment button C-16 is manipulated in setting all adjustment values at initial values. When the adjustment button C-15 or C-16 is manipulated, a display as shown in FIG. 8 is made in the display section D-4. FIG. 8 shows, in addition to the display examples in the display section D-4, the contents of displays and hexadecimal data of the respective displays.

The number of a selected channel is displayed in a display section D-5.

A setting button S-2 is manipulated in setting an initial value for a selected adjustment item. A setting button S-3 is selected to disable the use of this AV remote controller CP 31A-1. A setting button S-4 is selected to disable adjustments for a selected channel.

Since the AV remote controllers 31-2 to 31-N have the same configuration as the AV remote controller 31-1, they will not be described.

Returning to FIG. 3, the PCNS control device 32 inquires, on a regular basis, the AV remote controllers 31 of presence/absence of a transmission request. If a transmission request is present, the PCNS control device 32 gives transmission permission to the AV remote controller 31 concerned unless the PCNS control device 32 has another item to be processed hastily. As a result, the AV controller 31 transmits a control signal (adjustment condition). The PCNS control device 32 receives and stores it, and then outputs it to the PCNS bus 30.

Programs (video signals and audio signals) supplied from program suppliers are input to the AV adjusting devices 33. The AV adjusting devices 33 have a switch (not shown), such as a DIP switch, which enables setting of an address when manipulated. When a control signal that is transmitted from the PCNS control device 32 via the PCNS bus 30 is directed to the address set in such a manner, the AV adjusting device 33 acquires it. The Av adjusting device 33 performs adjustments on an input video signal and audio signal based on the acquired control signal and outputs a resulting video signal to the video router 22 and a resulting audio signal to the audio router 23.

Next, the operations of the monitor selectors 21 to the speakers 27 will be described. When the user makes setting to monitor both video and sound of a program of a certain channel P by manipulating the channel button $M_C$ on the monitor selector CP 21A-1 (see FIG. 4) of the monitor selector 21-1, for example, the monitor selector 21-1 supplies the number of the thus-set channel P to the AV remote controller 31-1 via the 9P cable 10-1 and generates a control signal for controlling the video router 22 and the audio router 23 and outputs it to the monitor selector control device 24 via the router bus 20.

The monitor selector control device 24 stores the number of channel P that is supplied from the monitor selector 21-1 in the built-in memory, and reads it out and outputs it to the video router 22 and the audio router 23 via the router bus 20.

The video router 22 performs routing so that a video signal that is output from an AV adjusting device 33-i (i=1, 2, 3, ..., L) that adjusts the program of channel P specified by a control signal that is supplied from the monitor selector control device 24 is supplied to the monitor 26-1. The audio router 23 performs routing so that an audio signal that is output from the AV adjusting device 33-i specified by the control signal is supplied to the speaker 27-1. As a result, video of the program of channel P is displayed on the monitor 26-1 and sound of the program of channel P is output from the speaker 27-1.

In this manner, the program of the selected channel P is monitored by the operations of the monitor selector 21 to the speaker 27.

Next, the operations of the AV remote controllers 31 to the AV adjusting devices 33 will be described. First, example configurations of the AV remote controllers 31, the PCNS control device 32, and the AV adjusting devices 33 will be described.

Figure 9:
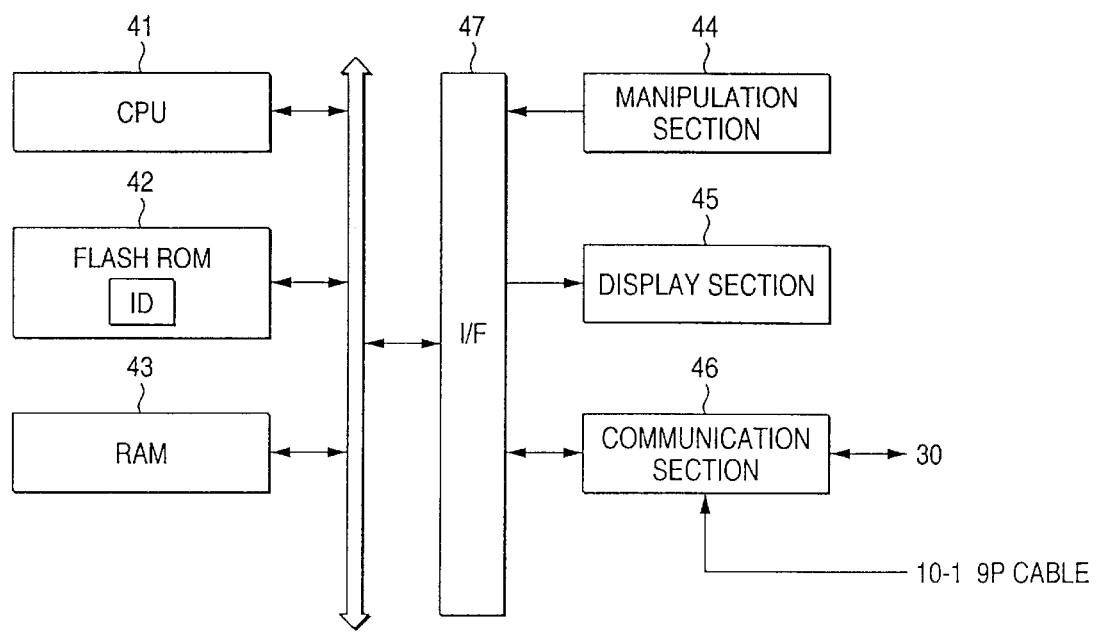
FIG. 9 is a block diagram showing an example configuration of an AV remote controller 31-1 shown in FIG. 3.

FIG. 9 shows an example configuration of the AV remote controller 31-1. A flash ROM 42 stores various programs to be executed by a CPU 41, the ID of the AV remote controller 31-1, and initial values of adjustment items (i.e., adjustment items that can be selected by the adjustment buttons C). A RAM 43 stores, when necessary, various data that are necessary when the CPU 41 executes various processes, and also stores a control signal that is supplied from the PCNS control device 32.

A manipulation section 44 is composed of the setting buttons S-1 to S-4, the adjustment buttons C-1 to C-16, and the volume dial T of the AV controller CP 31A-1 shown in FIG. 5 and other parts. When any of those buttons etc. is manipulated by the user, the manipulation section 44 outputs a command corresponding to the manipulation to the CPU 41.

A display section 45 has the display sections D-1 to D-5 of the AV remote controller CP 31A-1 shown in FIG. 5 and displays prescribed alphanumeric characters therein. Further, the display section 45 has a configuration shown in FIG. 10 that can cause the setting buttons S-1 to S-4 to output light and a configuration shown in FIG. 11 that can cause the adjustment buttons C-1 to C-16 to output light.

Figure 10:
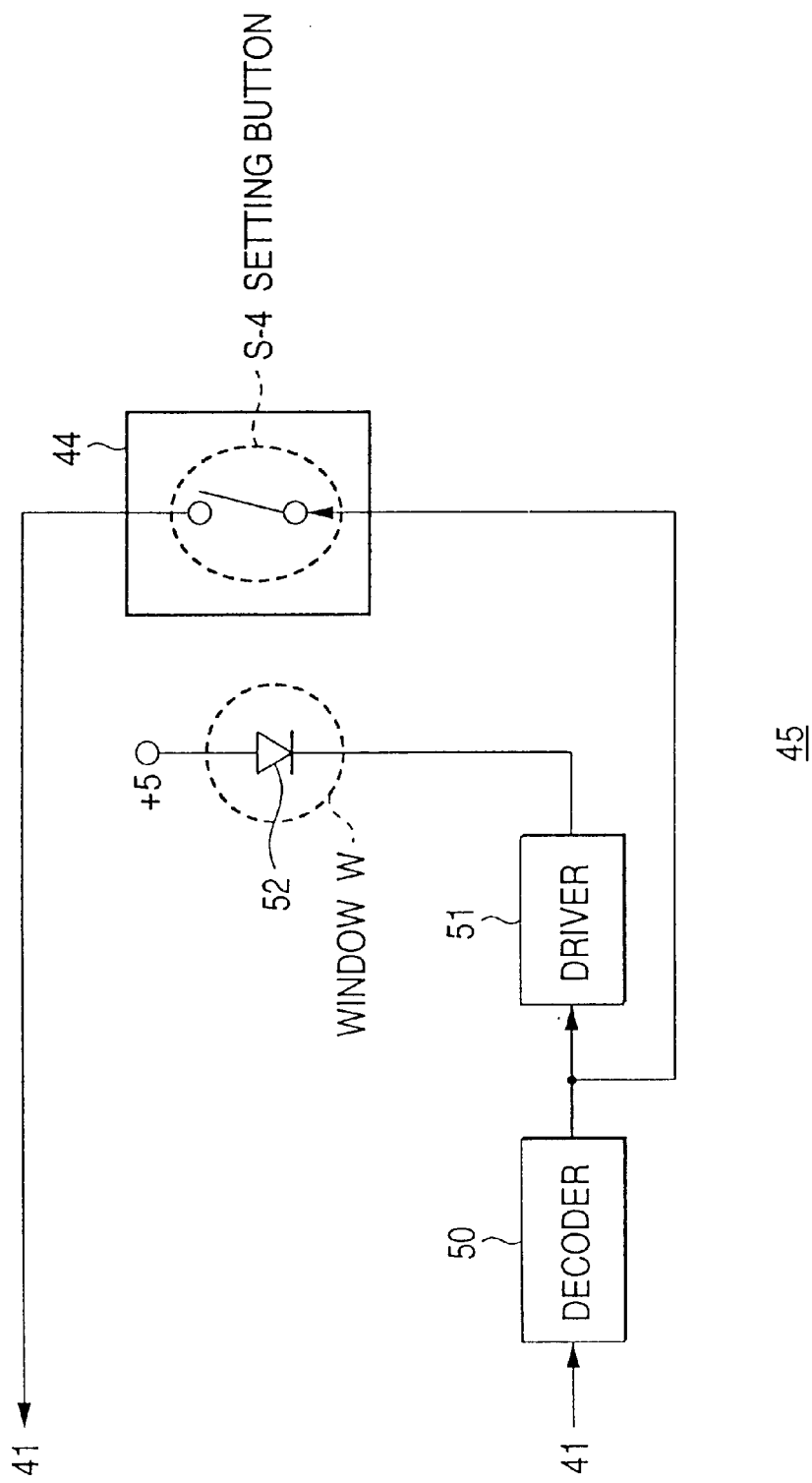
FIG. 10 is a block diagram showing an example configuration of a portion of a display section 45 that corresponds to a setting button S-4 of a manipulation section 44 shown in FIG. 9.

FIG. 10 shows an example configuration of a portion of the display section 45 that corresponds to the setting button S-4 of the manipulation section 44. A decoder 50 decodes a command that is supplied from the CPU 41 and outputs a resulting signal to a driver 51. The driver 51 switches the output to be supplied to an LED 52 to H or L according to the signal from the decoder 50. One terminal of the LED 52 is connected to a 5 V voltage source and the other terminal is connected to the driver 51. The LED 52 emits light when the output of the driver 51 is L. For example, when the LED 52 emits light, the window W that is provided at the center of the setting button S-4 of the AV remote controller CP 31A-1 shines. Checking whether the window W shines or not, the user can recognize whether the setting button S-4 was manipulated properly or not. Portions of the display section 45 that correspond to the setting buttons S-2 to S-4 of the manipulation section 44 have the same configuration as the portion of the display section 45 that corresponds to the setting button S-1, they will not be illustrated nor described.

Figure 11:
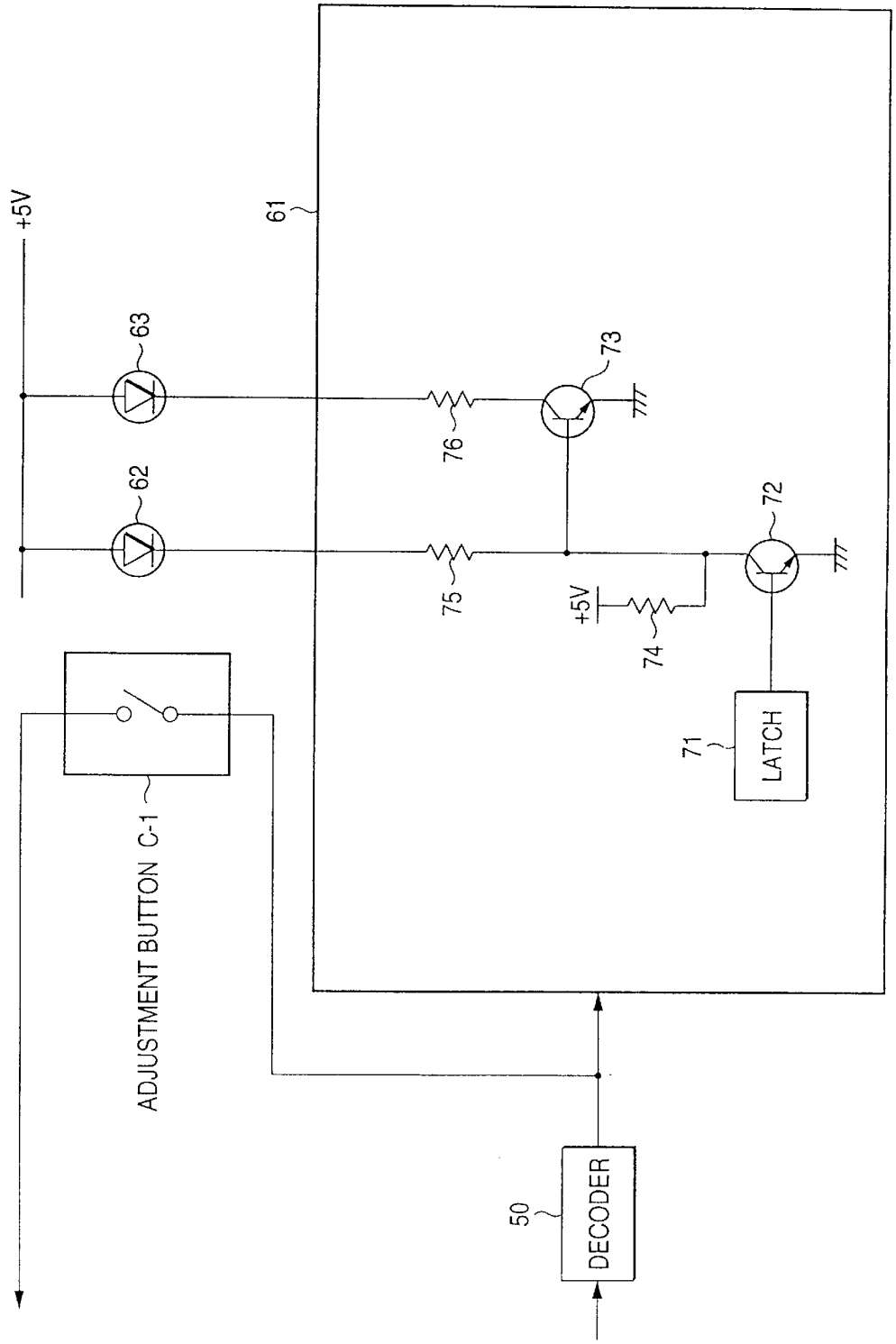
FIG. 11 is a circuit diagram showing an example configuration of a portion of the display section 45 that corresponds to an adjustment button C-1 of the manipulation section 44 shown in FIG. 9.

FIG. 11 shows an example configuration of a portion of the display section 45 that corresponds to the adjustment button C-1 of the manipulation section 44. The decoder 50 that is the same as in the portions of the display section 45 that correspond to the setting buttons S-1 to S-4 is connected to a driver 61, and decodes a command that is supplied from the CPU 41 and outputs a resulting signal. The driver 61 is connected to the respective cathodes of an LED 62 that emits green light and an LED 63 that emits orange light. The respective anodes of the LEDs 62 and 63 are connected to a 5 V voltage source.

A latch 71 of the driver 61 is connected to the base of an NPN transistor 72. The emitter of the transistor 72 is grounded. The collector of the transistor 72 is connected to the 5 V voltage source via a resistor 74 and to the cathode of the LED 62 via a resistor 75. The base of an NPN transistor 73 is connected to the collector of the transistor 72. The emitter of the transistor 73 is grounded, and its collector is connected to the cathode of the LED 63 via a resistor 76.

Having an SIO (serial I/O interface), for example, a communication section 46 shown in FIG. 9 outputs or receives a signal via the PCNS bus 30 to which the SIO is connected. Further, having an RS-422C interface, the communication section 46 receives a channel number from, for example, the monitor selector 21-1 via the 9P cable 10-1- to which the RS-422C interface is connected. An interface 47, which is provided between the CPU 41 and the manipulation section 44 to the communication section 46, performs interface operations.

Since the AV remote controllers 31-2 to 31-N have the same configuration as the AV remote controller 31-1, they will not be illustrated nor described.

Figure 12:
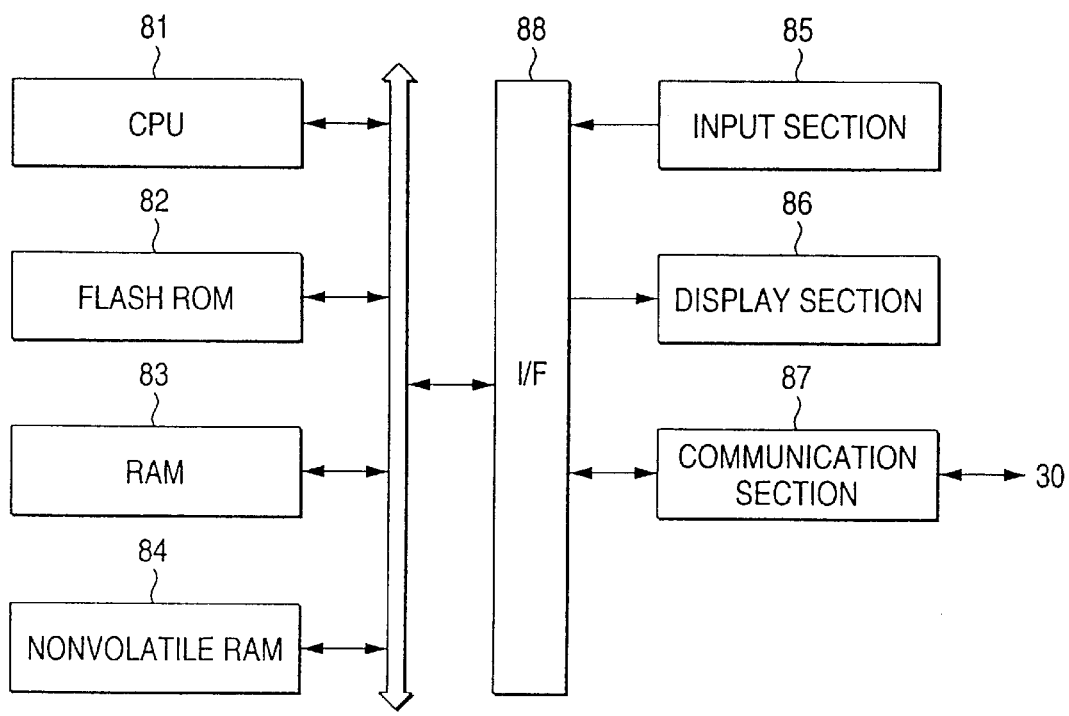
FIG. 12 is a block diagram showing an example configuration of a PCNS control device 32 shown in FIG. 3.
Figure 13:
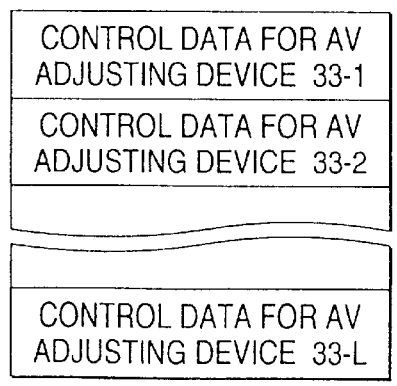
FIG. 13 shows memory areas of a nonvolatile memory RAM 84 shown in FIG. 12.

FIG. 12 shows an example configuration of the PCNS control device 32. A CPU 81 executes various processes according to various programs that are stored in a flash ROM 82. A RAM 83 stores, when necessary, various data that are necessary when the CPU 81 executes various processes. For example, as shown in FIG. 13, a nonvolatile RAM 84 is provided with memory areas corresponding to addresses that are set in the AV adjusting devices 33-1 to 33-L. Adjustment conditions and setting conditions (described later) that are set in control signals supplied from the AV remote controllers 31 are stored in the corresponding memory areas.

An input section 85 is manipulated by the user when necessary in inputting a prescribed command to the CPU 81. A display section 86 displays prescribed characters or an image. Having an SIO, for example, a communication section 87 outputs or receives a signal to or from the PCNS bus 30 to which the SIO is connected. An interface 88, which is provided between the CPU 81 and the input section 85 to the communication section 87, performs interface operations.

Figure 14:
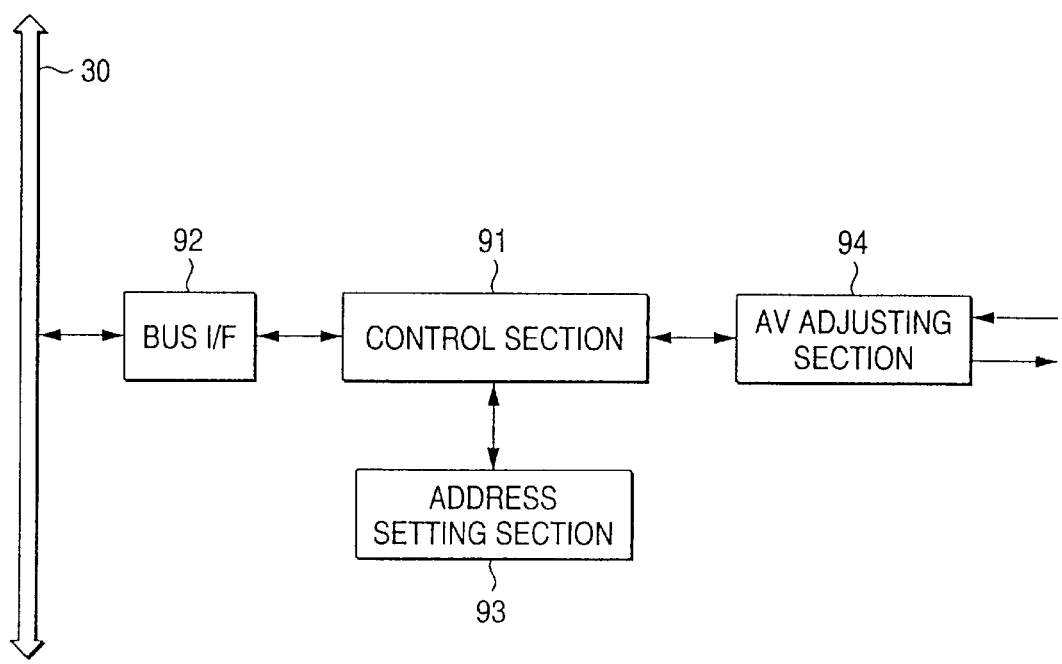
FIG. 14 is a block diagram showing an example configuration of an AV adjusting device 33-1 shown in FIG. 3.

FIG. 14 shows an example configuration of the AV adjusting device 33-1. Connected to the PCNS bus 30, a bus interface 92 receives or outputs data via the PCNS bus 30. An address setting section 93 is formed by a DIP switch, for example, and the address of the AV adjusting device 33-1 is set in the address setting section 93. An AV adjusting section 94 performs necessary adjustments on a video signal or an audio signal that is input from a program supplier, and outputs a resulting video signal to the video router 22 or a resulting audio signal to the audio signal 23.

A control section 91 controls the bus interface 92 to the AV adjusting section 94 and executes various processes. For example, when a control signal that is transmitted via the PCNS bus 30 is directed to the address that is set in the address setting section 93, the control section 91 controls the bus interface 91 to have it receive the control signal. Further, the control section 91 extracts an adjustment condition from the received control signal and controls the AV adjusting section 94.

The AV remote controllers 31, the PCNS control device 32, and the AD adjusting devices 33 are configured as described above. Next,-their operations will be described.

For example, if an adjustment condition is set as a result of selection of an adjustment button C of the AV remote controller CP 31A-1 and manipulation of the volume dial T in a state that the number of channel P that is output from the monitor selector 21-1 has been received via the 9P cable 10-1 and is displayed in the display section D-5 of the AV remote controller CP 31A-1, the manipulation section 44 outputs the thus-set adjustment condition to the CPU 41. If a setting button S of the AV remote controller CP 31A-1 is manipulated, the manipulation section 44 outputs a signal corresponding to the manipulation to the CPU 41.

An operation of causing an adjustment button C or a setting button S to output light is performed when a channel number is supplied from a monitor selector 21 or the adjustment button C or the setting button S is manipulated. A procedure of this operation will be described later.

The CPU 41 of the AV remote controller 31-1 generates a control signal that includes the address of an AV adjusting device 33-i corresponding to channel P, the ID of the AV remote controller 31-1 that is stored in the flash ROM 42, and an adjustment condition (when it has been set through manipulation of an adjustment button C). When a setting button S is manipulated, the CPU 41 generates a control signal that includes a setting condition corresponding to the manipulated setting button S. In this example, the generated control signal is constituted of 10-byte data for adjustment of a video signal and 10-byte data for adjustment of an audio signal (20 bytes in total). The details of a control signal generation process to be executed when the setting button S-4 is manipulated will be described later.

The CPU 41 of the AV remote controller 31-1 outputs the generated control signal to the PCNS control device 32 via the PCNS bus 30 after its transmission is permitted by the PCNS control device 32.

The CPU 81 of the PCNS control device 32 controls the communication section 87 to have it receive the control signal that is transmitted from the AV remote controller 31-1. Then, the CPU 81 extracts the adjustment condition, the setting condition, or the like from the control signal, and stores it in the memory area of the nonvolatile RAM 84 corresponding to the address of the AV adjusting device 33-i that is set in the control signal. That is, when receiving the control signal from the AV remote controller 31, the PCNS control device 32 immediately reads out the adjustment condition or the setting condition that has just been stored in the nonvolatile RAM 84, generates a control signal by adding the address of the AV adjusting device 33-i to it, and controls the communication section 87 to have it output the generated control signal to the PCNS bus 30.

Further, the PCNS control device 32 reads out, at a constant cycle, an adjustment condition or a setting condition that is stored in the nonvolatile RAM 82, generates a control signal by adding the address of the corresponding AV adjusting device 33-i to it, and outputs the generated control signal to the PCNS bus 30.

The control section 91 of the AD adjusting device 33-i controls the bus interface 92 to have it receive the control signal that is transmitted via the PCNS bus 30 and directed to the AD adjusting device 33-i. The control section 91 extracts the adjustment condition from the received control signal and supplies it to the AV adjusting section 94. Based on the adjustment condition supplied from the control section 91, the AV adjusting section 94 adjusts an input video signal or audio signal of a program of channel P and outputs a resulting signal.

Since the video signal that is output from the AV adjusting section 94 of the AV adjusting device 33-i is routed by the video router 22 so as to be supplied to the monitor 26-1, adjusted video of the program of channel P is displayed on the monitor 26-1. Since the audio signal that is output from the AV adjusting section 94 of the AV adjusting device 33-i is routed by the audio router 23 so as to be supplied to the speaker 27-1, adjusted sound of the program of channel P is output from the speaker 27-1.

The control signal (i.e., the control signal directed to the AV adjusting device 33-i) that originates from the AV remote controller 31-1 and is output from the PCNS control device 32 to the PCNS bus 30 is received by not only the AV remote controller 31-1 but also the AV remote controllers 31-2 to 31-N and stored in their respective RAMS 43. Therefore, the AV remote controllers 31 can recognize adjustment conditions and setting conditions that are set for respective channels, which enables a process of prohibiting adjustment of the program of a prescribed channel (described later).

Figure 15:
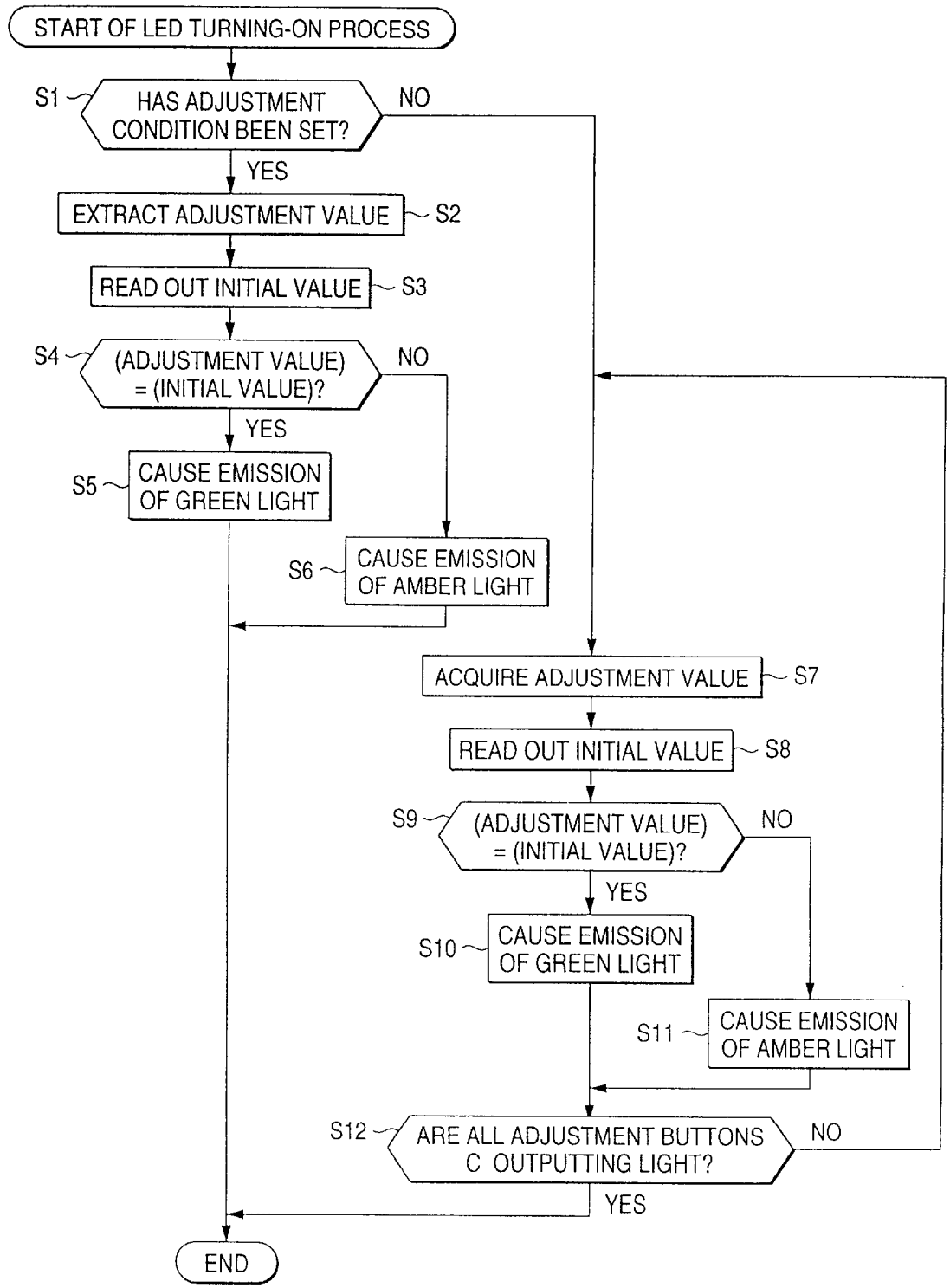
FIG. 15 is a flowchart showing an LED turning-on process.

Next, an operation procedure of the AV remote controllers 31 in causing an adjustment button C to output light will be described with reference to a flowchart of FIG. 15. For example, in the AV remote controller 31-1, in a state that the number of a selected channel P is supplied from the monitor selector 21-1 and displayed in the display section D-5 of the AV remote controller CP 31A-1, at step SI the CPU 41 of the AV remote controller 31-1 judges whether an adjustment condition (an adjustment item and an adjustment value) has been set as a result of selection of an adjustment button C-i and manipulation of the volume button T. If an adjustment condition has been set, the process goes to step S2, where the adjustment value is extracted from the thus-set adjustment condition.

Then, at step S3, the CPU 41 reads out, from the flash ROM 42, the initial value of the adjustment item of the adjustment condition that was judged "set" at step S1. At step S4, the CPU 41 judges whether the adjustment value that was extracted at step S2 is equal to the initial value that was read out at step S3. If it is judged that the adjustment value is equal to the initial value, the process goes to step S5, where an operation of causing the adjustment button C-i to output green light is performed.

A portion (not shown) of the display section 45 corresponding to the adjustment button C-i has the same configuration as the portion of the display section 45 shown in FIG. 11 that corresponds to the adjustment button C-1. Therefore, in the following description, in the portion of the display section 45 corresponding to the adjustment button C-i, the elements corresponding to the elements of the portion of the display section 45 that corresponds to the adjustment button C-1 are denoted by adding "-i" to the reference numerals of the latter, respectively.

Now, the operation of causing the adjustment button C-i to output green light will be described. The CPU 41 outputs a command for causing the LED 62-i corresponding to the LED 62 shown in FIG. 11 to emit light to the decoder 50 of the display section 45 via the interface 47. When receiving the command from the CPU 41, the decoder 50 decodes it and outputs a resulting signal to the driver 61-i. Based on the signal that is output from the decoder 50, the output of the latch 71-i of the driver 61-i is turned to H. As a result, the transistor 72-i is turned on, a current flows through the LED 62-i, and the LED 62-i emits light. At this time, since the base of the transistor 73-i is at a low potential (i.e., grounded via the transistor 72), the transistor 73-i is off. As a result, no current flows through the LED 63-i and it does not emit light.

When the LED 62-i emits light in this manner, the adjustment button C-i outputs green light.

If it is judged at step S4 that the adjustment value is different from the initial value, the process goes to step S6, where an operation of causing the adjustment button C-i to output orange light is performed.

Now, the operation of causing the adjustment button C-i to output orange (amber) light will be described. The CPU 41 outputs a command for causing the LED 63-i to emit light to the decoder 50 of the display section 45 via the interface 47. When receiving the command from the CPU 41, the decoder 50 decodes it and outputs a resulting signal to the driver 61-i. Based on the signal that is output from the decoder 50, the output of the latch 71-i of the driver 61-i is turned to L. As a result, the transistor 72-i is turned off, whereupon a high voltage is applied to the base of the transistor 73-i via the resistor 74 and the transistor 73-i is turned on. As a result, a current flows through the LED 63-i and the LED 63-i emits light. At this time, since the transistor 72-i is off, no current flows through the LED 62-i and it does not emit light. P When the LED 63-i emits light in this manner, the adjustment button C-i outputs orange (amber) light.

If it is judged at step S1 that no adjustment condition has been set, the process goes to step S7, where the CPU 41 extracts, from a control signal that is stored in the RAM 43 and directed to one adjustment button C-i, an adjustment value that is set in the control signal. At step S8, the CPU 41 reads out the initial value of this adjustment item from the flash ROM 42.

Then, at step S9, the CPU 41 judges whether the adjustment value that was extracted at step S7 is equal to the initial value that was read out at step S8. If it is judged that the adjustment value is equal to the initial value, the process goes to step S10. If they are judged different from each other, the process goes to step S11.

At step S10, an operation of causing the adjustment button C-i to output green light is performed. At this step, the same operation as performed at step S5 is performed. Therefore, this operation is not described here. At step S11, an operation of causing the adjustment button C-i to output orange (amber) light is performed. At this step, the same operation as performed at step S6 is performed. Therefore, this operation is not described here.

After the execution of step S10 or S11, the process goes to step S12, where the CPU 41 judges whether all adjustment buttons C-1 to C-16 are outputting green or orange light. If there remains adjustment buttons C that are not outputting light, the process returns to step S7 to repeatedly execute the following steps for the portion of the display section 45 corresponding to the next adjustment button C-i (i=i+1) until all adjustment buttons C output light.

In this example, one of the LEDs 62 and 63 always emits light.

Figure 16:
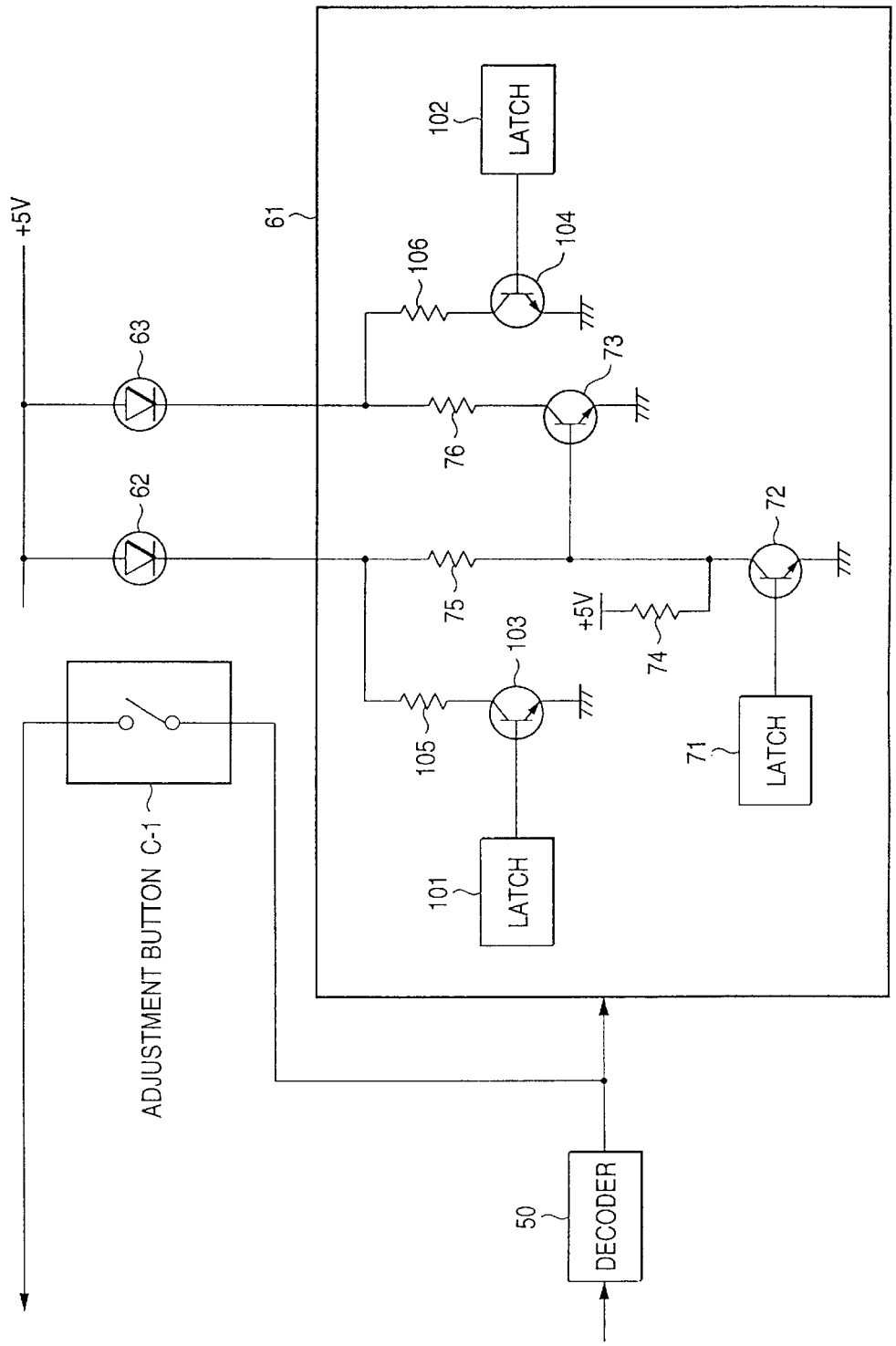
FIG. 16 is a circuit diagram showing another example configuration of the portion of the display section 45 that corresponds to the adjustment button C-1 of the manipulation section 44 shown in FIG. 9.

FIG. 16 shows another example of the driver 61. In this example, to enable adjustment of the emission light intensity of the LEDs 62 and 63, latches 101 and 102, NPN transistors 103 and 104, and resistors 105 and 106 are provided additionally. The latch 101 is connected to the base of the transistor 103. The emitter of the transistor 103 is grounded and its collector is connected to the cathode of the LED 62 via the resistor 105. The latch 102 is connected to the base of the transistor 104. The emitter of the transistor 104 is grounded and its collector is connected to the cathode of the LED 63 via the resistor 106.

For example, if the output of the latch 101 is turned to H and the transistor 103 is thereby turned on in a state that the LED 62 is emitting light (i.e., the output of the latch 71 is H and hence the transistor 72 is on), the current flowing through the LED 62 increases by a current that comes to flow to the transistor 103. Therefore, the LED 62 comes to emit light that is stronger by an amount corresponding to the increased current. If the output of the latch 102 is turned to H and the transistor 104 is thereby turned on in a state that the LED 63 is emitting light (i.e., the output of the latch 71 is L and hence the transistor 72 is off and the transistor 73 is on), the current flowing through the LED 63 increases by a current that comes to flow to the transistor 103. Therefore, the LED 63 comes to emit light that is stronger by an amount corresponding to the increased current.

The emission light intensity of the LEDs 62 and 63 can be adjusted in this manner. Therefore, for example, when an adjustment button C-i is manipulated (step S1) in a state that all adjustment buttons C are outputting green or orange (amber) light (steps S7 to S12), the adjustment button C-i is caused to output stronger light (steps S3 to S6) so that the user can more easily recognize the selection of the adjustment button C-i.

Next, an operation procedure for prohibiting adjustment of the program of a prescribed channel will be described with reference to a flowchart of FIG. 17.

For example, in a state that the number of channel P that is output from the monitor selector 21-1 is received via the 9P cable 10-1 and displayed in the display section D-5 of the AV remote controller CP 31A-1, at step S21 the CPU 41 of the AV remote controller 31-1 judges whether an adjustment condition has been set as a result of selection of an adjustment button C of the AV remote controller CP 31A-1 and manipulation of the volume button T. If no adjustment condition has been set, the process goes to step S22, where it is judged whether the setting button S-4 has been manipulated.

If it is judged at step S22 that the setting button S-4 has not been manipulated, the process returns to step S21; that is, the CPU 41 waits until an adjustment button C or the setting button S-4 is manipulated. If it is judged at step S22 that the setting button S-4 has been manipulated, the process goes to step S23, where the CPU 41 generates a control signal that consists of the address of the AV adjusting device 33-i corresponding to channel P, the ID of the remote controller 31-1 that is stored in the flash ROM 42, and a setting condition that is a condition that control on the AV adjusting device 33-i is prohibited (i.e., a control prohibition setting condition). When the setting button S-4 of the AV remote controller CP 31A-1 is manipulated, its window W comes to output light.

Then, at step S24, the CPU 41 controls the communication section 46 to have it output the control signal to the PCNS control device 32 via the PCNS bus 30 after its transmission is permitted by the PCNS control device 32. Then, the process is finished.

The control signal (i.e., the control signal directed to the AV adjusting device 33-i) that was generated and output to the PCNS control device 32 in the above manner and in which the control prohibition setting condition for the AV adjusting device 33-i is set is supplied from the PCNS control device 32 to all AV remote controllers 31-1 to 31-N and stored there.

If it is judged at step S21 that an adjustment condition has been set, the process goes to step S25, where the CPU 41 judges whether a control signal directed to the AV adjusting device 33-i is stored in the RAM 43. If it is stored, the process goes to step S26, where the CPU 41 judges whether a control prohibition setting condition is set in the control signal.

If it is judged at step S26 that the control signal that is stored in the RAM 43 and directed to the AV adjusting device 33-i includes a control prohibition setting condition, the process goes to step S27, where the CPU 41 judges whether its own ID (i.e., the ID of the AV remote controller 31-1) is set in the control signal. If its own ID is not set, the process is finished. That is, since no control signal for the AV adjusting device 33-i is generated, the program of channel P is not adjusted.

If the CPU 41 judges at step S25 that no control signal directed to the AV adjusting device 33-i is stored in the RAM 43, if the CPU 41 judges at step S26 that the control signal stored in the RAM 43 and directed to the AV adjusting device 33-i does not include control prohibition information, or if the CPU 41 judges at step S27 that its own ID is set in the control signal stored in the RAM 43 and directed to the AV adjusting device 33-i, the process goes to step S28, where the CPU 41 generates a control signal that consists of the address of the AV adjusting device 33-i and the adjustment condition. That is, no control prohibition setting condition is set in the control signal generated at step S28.

At step S29, the CPU 41 controls the communication section 46 to have it output the control signal that was generated at step S28 to the PCNS control device 32 via the PCNS bus 30 after its transmission is permitted by the PCNS control device 32. Then, the process is finished.

As described above, a control signal for prohibiting adjustments for a selected channel can be generated by manipulating the setting button S-4 of the AV remote controller CP 31A-1 (steps S22 and S23). Since a control signal in which a new adjustment condition is set is no longer generated for the AV adjusting device 33 corresponding to the controlprohibited channel (steps S25–S27), the program of the selected channel is not adjusted. That is, for example, if a user manipulates the setting button S-4 after adjusting the program of channel P by setting an adjustment condition by manipulating the AV remote controller CP 31A-1 of the AV remote controller 31-1 (steps S28 and S29), another user's altering the adjustment conditions that have been set for channel P by manipulating the AV remote controller CP of another AV remote controller 312 to 31-N is prohibited.

In a state that adjustments for channel P are prohibited as a result of the user's manipulating the setting button S-4 of the AV remote controller CP 31A-1 of the AV remote controller 31-1, the setting of prohibition of adjustments for channel P can be cancelled by again manipulating the setting button S-4 of the AV remote controller CP 31A-1.

In the above configuration, video signals and audio signals are input to each AV adjusting device 33 via 150 lines.

As described above, an AV remote controller 31 directly acquires the number of a selected channel from a monitor selector 21 and generates a control signal based on the channel number, and the PCNS control device 32 supplies the control signal to an AV adjusting device 33 via the PCNS bus 30. Therefore, a new AV adjusting device 33 or AV remote controller 31 can be added easily. For example, a new AV adjusting device 33 can be added by setting an address by manipulating a switch and connecting it to the PCNS bus 30.

Since the above configuration eliminates the need for connecting the AV adjusting devices 33 to the AV remote controllers 31 via 9P cables, the apparatus can be made less expensive and the entire system can be reduced in size.

Thirty-two monitor selectors 21 and 32 AV remote controllers 31 can be provided (i.e., N=32). In this case, a total of 1,600 AV adjusting devices 33 can be provided.

In the above embodiment, the two buses, that is, the router bus 20 and the PCNS bus 30, are provided. For example, if the total number of AV adjusting devices 33 is smaller than 250, the two buses can be combined into a single bus.

What is claimed is:

1. A transmission system for transmitting television programs of a plurality of channels, comprising:

means for receiving a plurality of source television programs supplied from a plurality of program supply sources, respectively;

routing means for selecting at least one of the plurality of source television programs, and for routing the selected television program;

means for adjusting a video signal and/or audio signal included in the selected television program so that the video signal and/or the audio signal of the selected source television program and video signals and/or audio signals of the other source television programs have common settings; and transmitting means for multiplexing an adjusted television program that is output from the adjusting means with the other television programs that are output from the routing means, and transmitting multiplexed television signals;

whereby said video signal is adjusted so that it's level is substantially the same as the levels of said video signals of said other source television programs and/or said audio signal is adjusted such that it's language is same as the languages of said audio signals of said other source television programs;

whereby said video signal and/or said audio signal are/is adjusted when a supplied adjustment condition is different from a stored adjustment condition; and whereby it is determined whether or not adjustment is necessary by polling a multiple of devices for a signal indicating that adjustment is necessary.

2. A transmission method for transmitting television programs of a plurality of channels, comprising:

receiving a plurality of source television programs supplied from a plurality of program supply sources, respectively;

selecting at least one of the plurality of source television programs, and routing the selected television program;

adjusting a video signal and/or audio signal included in the selected television program so that the video signal and/or the audio signal of the selected source television program and video signals and/or audio signals of the other source television programs have common settings; and multiplexing an adjusted television program with the other television programs that have been routed, and transmitting multiplexed television signals;

whereby said video signal is adjusted so that it's level is substantially the same as the levels of said video signals of said other source television programs and/or said audio signal is adjusted such that it's language is same as the languages of said audio signals of said other source television programs;

whereby said video signal and/or said audio signal are/is adjusted when a supplied adjustment condition is different from a stored adjustment condition; and whereby it is determined whether or not adjustment is necessary by polling a multiple of devices for a signal indicating that adjustment is necessary.

3. A signal adjusting apparatus for adjusting video signals and/or audio signals constituting a plurality of television programs, comprising:

means for receiving a plurality of source television programs;

routing means for routing the plurality of source television programs, and for selecting at least one of the plurality of source television programs; and means for adjusting a video signal and/or audio signal of the selected television program so that the video signal and/or the audio signal of the selected television program and video signals and/or audio signals of the other television programs have common characteristics;

whereby said video signal is adjusted so that it's level is substantially the same as the levels of said video signals of said other source television programs and/or said audio signal is adjusted such that it's language is same as the languages of said audio signals of said other source television programs;

whereby said video signal and/or said audio signal are/is adjusted when a supplied adjustment condition is different from a stored adjustment condition; and whereby it is determined whether or not adjustment is necessary by polling a multiple of devices for a signal indicating that adjustment is necessary.

4. A signal adjusting method for adjusting video signals and/or audio signals constituting a plurality of television programs, comprising the steps of:

receiving a plurality of source television programs;

routing the plurality of source television programs, and selecting at least one of the plurality of source television programs; and adjusting a video signal and/or audio signal of the selected television program so that the video signal and/or the audio signal of the selected television program and video signals and/or audio signals of the other television programs have common characteristics;

whereby said video signal is adjusted so that it's level is substantially the same as the levels of said video signals of said other source television programs and/or said audio signal is adjusted such that it's language is same as the languages of said audio signals of said other source television programs;

whereby said video signal and/or said audio signal are/is adjusted when a supplied adjustment condition is different from a stored adjustment condition; and whereby it is determined whether or not adjustment is necessary by polling a multiple of devices for a signal indicating that adjustment is necessary.

5. A routing apparatus for routing a plurality of source television programs, comprising:

selecting means for selecting at least one of the plurality of source television programs;

routing means for routing television programs;

adjusting means for adjusting a characteristic of a video signals and/or an audio signals of a source television signal, and for outputting an adjusted television program; and control means for controlling the routing means so that the selected source television program is supplied to the adjusting means and that the adjusted television program and source television programs that were not selected by the selecting means are supplied to multiplexing means;

whereby said video signal is adjusted so that it's level is substantially the same as the levels of said video signals of said other source television programs and/or said audio signal is adjusted such that it's language is same as the languages of said audio signals of said other source television programs;

whereby said video signal and/or said audio signal are/is adjusted when a supplied adjustment condition is different from a stored adjustment condition; and whereby it is determined whether or not adjustment is necessary by polling a multiple of devices for a signal indicating that adjustment is necessary.

6. A routing apparatus for routing a plurality of source television programs, comprising:

selecting means for selecting at least one of the plurality of source television programs;

routing means for routing television programs;

adjusting means for adjusting a characteristic of a video signals and/or an audio signals of a source television signal, and for outputting an adjusted television program;

monitoring means for monitoring a video signal and/or an audio signal of the adjusted television program; and control means for controlling the routing means so that the selected television program is supplied to the adjusting means and that the adjusted television program that is output from the adjusting means is supplied to the monitoring means so that a result of an adjustment by the adjusting means of the video signal and/or the audio signal of the adjusted television program can be monitored on a real-time basis by the monitoring means;

whereby said video signal is adjusted so that it's level is substantially the same as the levels of said video signals of said other source television programs and/or said audio signal is adjusted such that it's language is same as the languages of said audio signals of said other source television programs;

whereby said video signal and/or said audio signal are/is adjusted when a supplied adjustment condition is different from a stored adjustment condition; and whereby it is determined whether or not adjustment is necessary by polling a multiple of devices for a signal indicating that adjustment is necessary.

* * * * *